United States Patent
Fan et al.

(10) Patent No.: US 9,218,322 B2
(45) Date of Patent: Dec. 22, 2015

(54) PRODUCING WEB PAGE CONTENT

(75) Inventors: Jian Fan, San Jose, CA (US); Ping Luo, Beijing (CN); Li-Wei Zheng, Beijing (CN); Samson J. Liu, Mountain View, CA (US); Suk Hwan Lim, Mountain View, CA (US); Jerry J. Liu, Cupertino, CA (US); Yuhong Xiong, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 357 days.

(21) Appl. No.: 13/811,912

(22) PCT Filed: Jul. 28, 2010

(86) PCT No.: PCT/CN2010/001143
§ 371 (c)(1),
(2), (4) Date: Jan. 24, 2013

(87) PCT Pub. No.: WO2012/012911
PCT Pub. Date: Feb. 2, 2012

(65) Prior Publication Data
US 2013/0124953 A1    May 16, 2013

(51) Int. Cl.
G06F 17/00 (2006.01)
G06F 17/21 (2006.01)
G06F 17/30 (2006.01)
G06F 17/22 (2006.01)

(52) U.S. Cl.
CPC .............. *G06F 17/21* (2013.01); *G06F 17/212* (2013.01); *G06F 17/227* (2013.01); *G06F 17/30896* (2013.01)

(58) Field of Classification Search
CPC .................. G06F 17/30896; G06F 17/211

USPC .................. 715/200, 255, 243, 246, 247
See application file for complete search history.

(56) References Cited

U.S. PATENT DOCUMENTS

| | | | | |
|---|---|---|---|---|
| 5,926,825 | A * | 7/1999 | Shirakawa ..................... | 715/273 |
| 7,949,935 | B2 * | 5/2011 | Friedman .......... | G06F 17/30805 715/205 |
| 8,301,998 | B2 * | 10/2012 | Ruvini .......... | 715/243 |
| 8,558,808 | B2 * | 10/2013 | Forstall .......... | G06F 3/04817 345/156 |
| 8,606,796 | B2 * | 12/2013 | Martin .......... | G06F 17/30675 704/2 |
| 2003/0014445 | A1 * | 1/2003 | Formanek et al. ............ | 707/526 |
| 2004/0117737 | A1 * | 6/2004 | Bera ..................... | G06F 17/211 715/255 |

(Continued)

FOREIGN PATENT DOCUMENTS

GB   2373698 A   9/2002
JP   2006276989 A   10/2006

OTHER PUBLICATIONS

Debnath et al., Automatic Identification of Informative Sections of Web Pages, IEEE 2005, pp. 1233-1246.*

(Continued)

*Primary Examiner* — Cong-Lac Huynh
(74) *Attorney, Agent, or Firm* — Hewlett-Packard Patent Department

(57) ABSTRACT

A method for producing web page content includes identifying blocks within a web page. The blocks are selectively assembled into sections. The sections are selectively assembled into article candidates. An article candidate that includes article content is distinguished from article candidates that do not include article content. Content is produced only from the article candidate distinguished as including article content.

17 Claims, 12 Drawing Sheets

(56) References Cited

U.S. PATENT DOCUMENTS

| | | | |
|---|---|---|---|
| 2005/0066269 A1* | 3/2005 | Wang et al. ................... | 715/513 |
| 2005/0246623 A1* | 11/2005 | Ma et al. ..................... | 715/501.1 |
| 2006/0005114 A1 | 1/2006 | Williamson et al. | |
| 2006/0156226 A1* | 7/2006 | Dejean et al. ................. | 715/517 |
| 2006/0218477 A1* | 9/2006 | Shibata ................. | G06F 17/241 715/201 |
| 2008/0115057 A1 | 5/2008 | Grandhi et al. | |
| 2008/0215997 A1* | 9/2008 | Wu ....................... | G06F 3/0481 715/760 |
| 2008/0270891 A1* | 10/2008 | Friedman .......... | G06F 17/30905 715/240 |
| 2008/0307328 A1* | 12/2008 | Hatcher ............. | H04L 12/5835 715/760 |
| 2010/0185568 A1* | 7/2010 | Bates et al. ..................... | 706/12 |
| 2011/0131485 A1* | 6/2011 | Bao et al. ..................... | 715/243 |
| 2011/0302524 A1* | 12/2011 | Forstall ............ | G06F 17/30905 715/781 |
| 2012/0042240 A1* | 2/2012 | Oliveira ................ | G06F 17/212 715/243 |
| 2012/0089903 A1* | 4/2012 | Liu ................... | G06F 17/30905 715/234 |
| 2012/0095951 A1* | 4/2012 | Ray ................... | G06F 17/30719 706/47 |
| 2012/0260160 A1* | 10/2012 | Kim ...................... | G06F 3/0481 715/234 |
| 2013/0061132 A1* | 3/2013 | Zheng et al. ................... | 715/234 |
| 2014/0372873 A1* | 12/2014 | Leung et al. ................. | 715/243 |
| 2015/0066964 A1* | 3/2015 | Makino et al. ................ | 707/755 |

OTHER PUBLICATIONS

Song et al., Learning Important Models for Web Page Blocks based on Layout and Content Analysis, ACM 2004, pp. 1-10.*

Sun et al., DOM Based Content Extraction via Text Density, ACM 2011, pp. 245-254.*

Li et al., Extraction of Informative Blocks from Web Pages based on VIPS, Google 2010, pp. 271-277.*

Mehta, Rupesh R. et al., Extracting Semantic Structure of Web Documents Using Content and Visual Information, May 10-14, 2005, 2 pages http://www.facweb.iikgp.ernet.in/~pabitra/paper/www05_semantic.pdf.

State Intellectual Property Office, International Search Report, May 5, 2011, 3 pages, Beijing, China.

* cited by examiner

PRODUCING WEB PAGE CONTENT

BACKGROUND

Web pages are often designed for screen display, not print. In addition to a main article that can include text and images, web pages often include dynamically generated advertisements and other peripheral information. As a consequence, users desiring to print web pages are often frustrated with the results. A printed web page can have a cluttered appearance spanning several pages with the main article (interspersed with advertisements and other peripheral content) appearing on one page or split between two or more pages.

DRAWINGS

Figure 7:
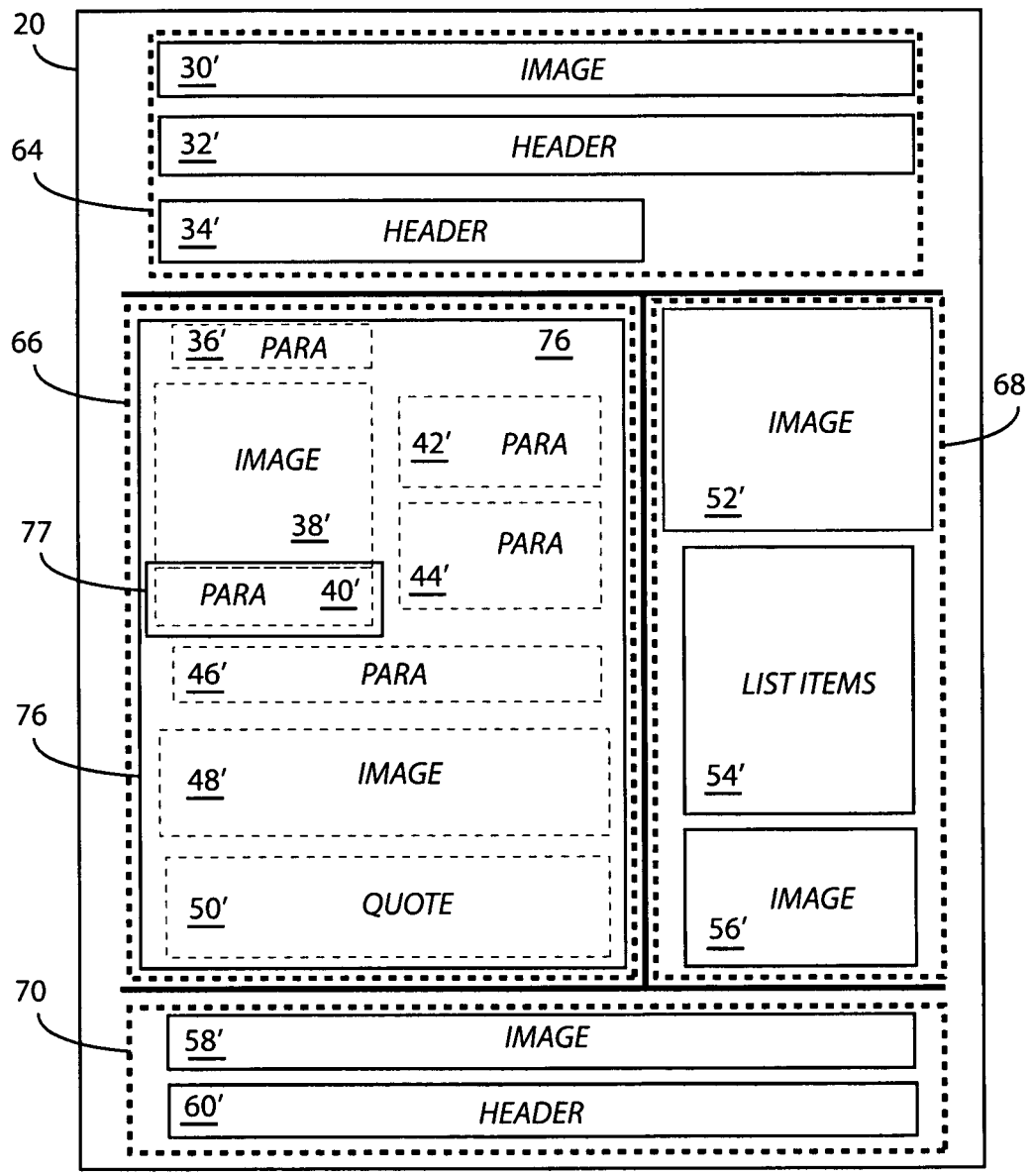
Figure 8:
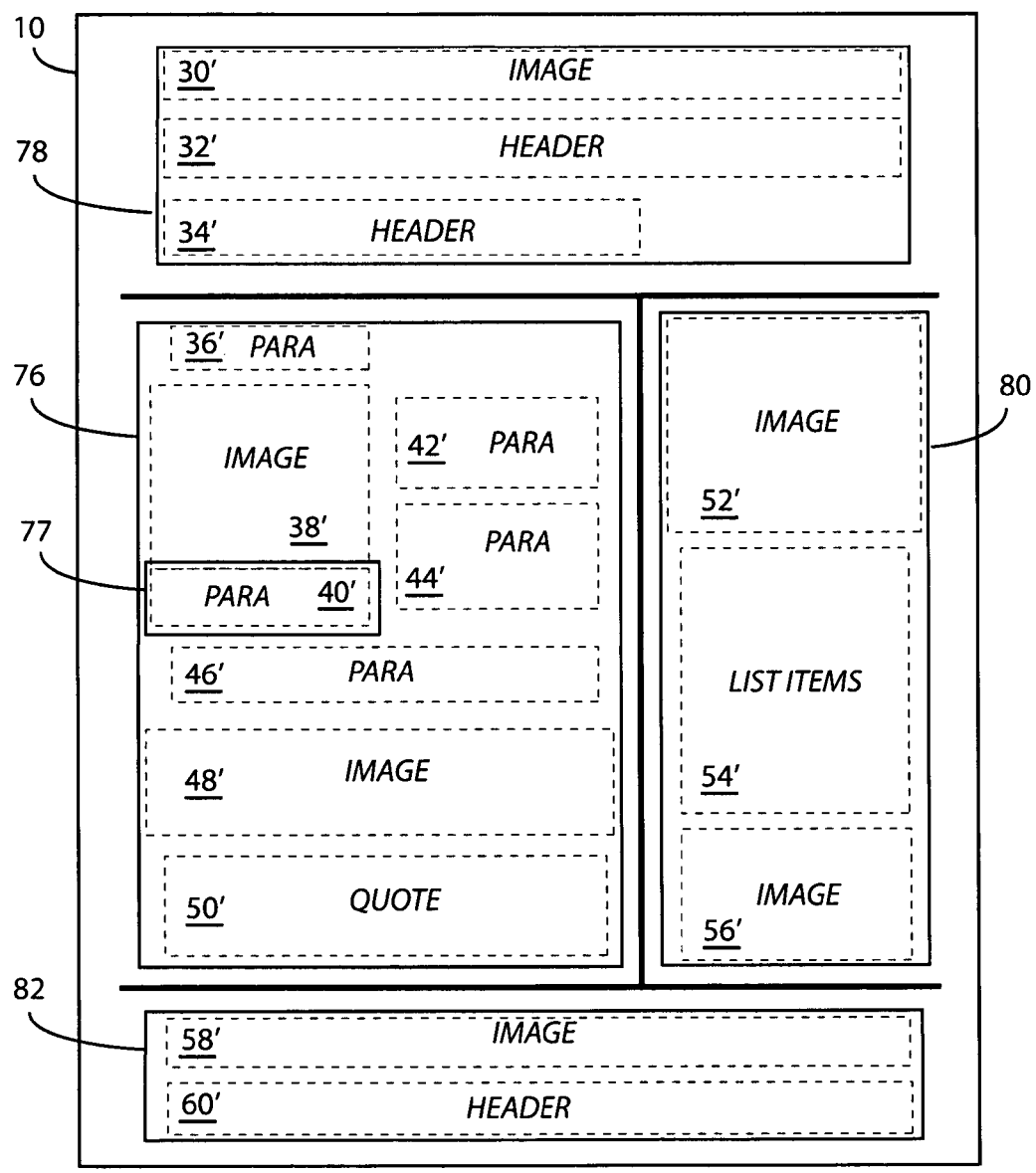

FIGS. 7-8 depiction the web page with sections being combined into article candidates.

Figure 9:
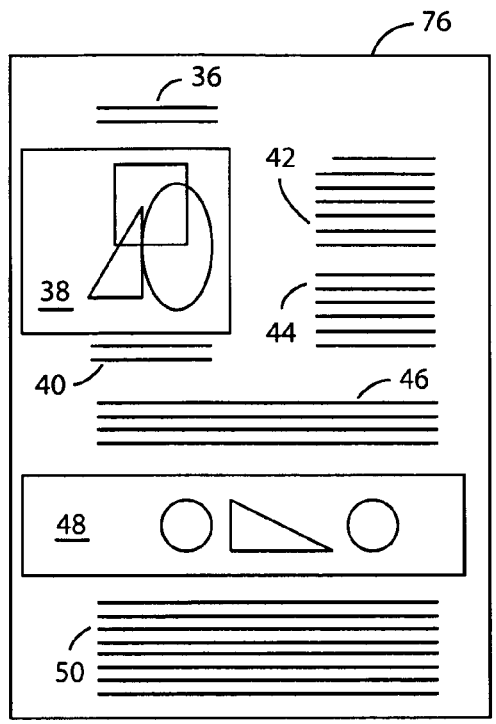
Figure 10:
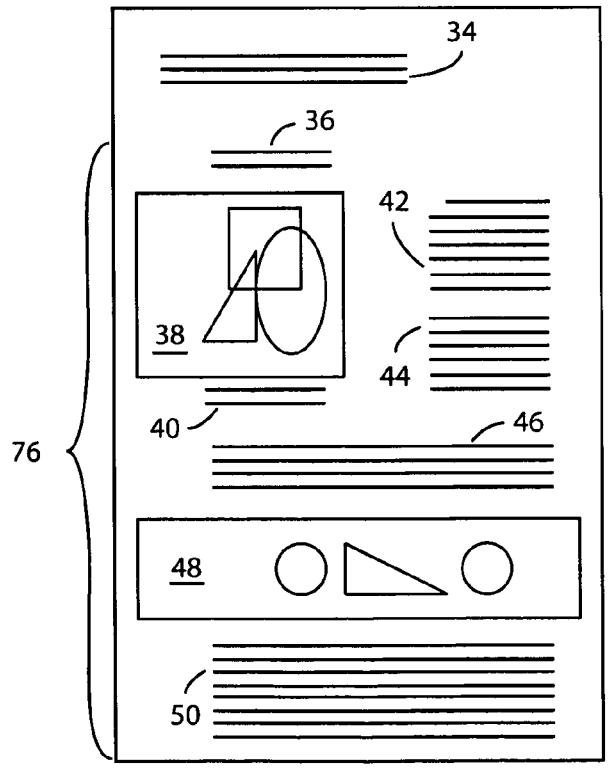

FIGS. 9-10 depict identified article candidates according to embodiments.

Figure 11:
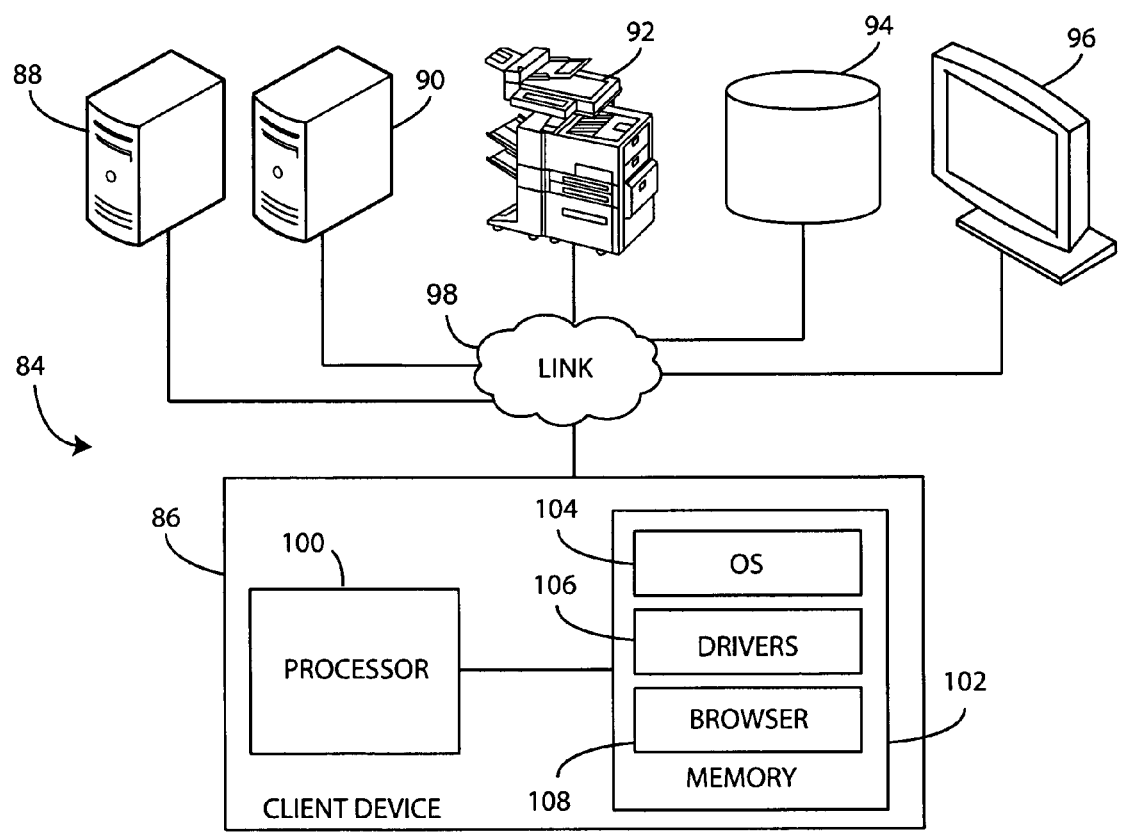

FIG. 11 depicts an in environment in which the system of Claim 9 may be implemented according to an embodiment.

Figure 12:
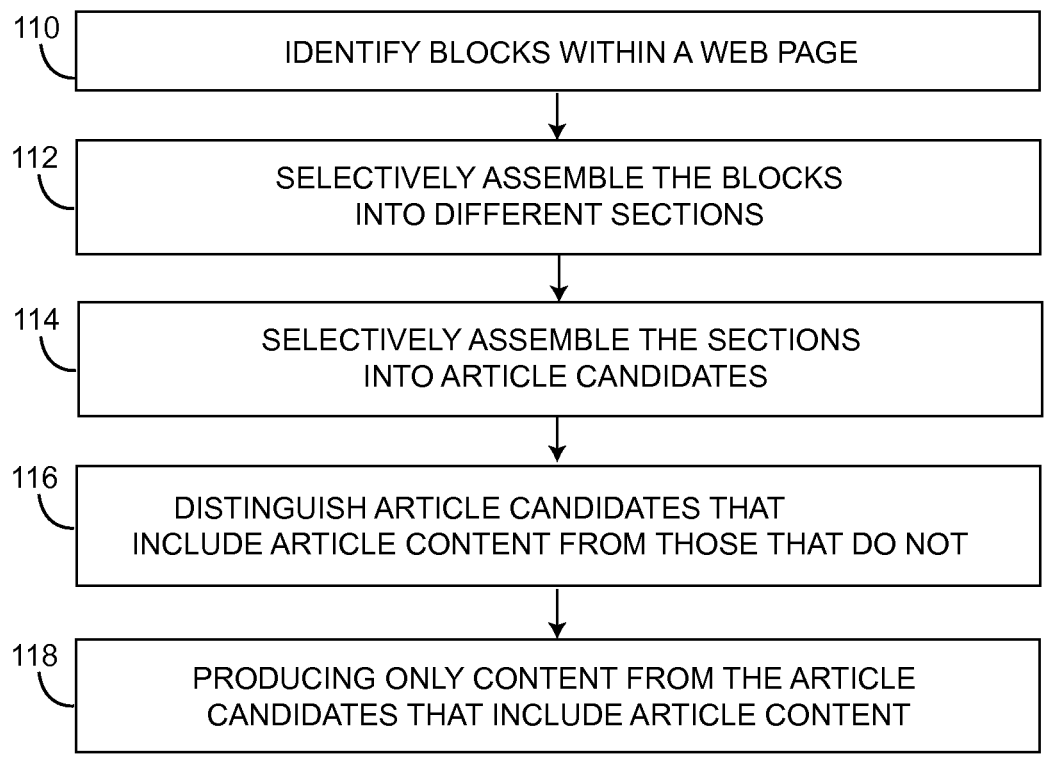
Figure 13:
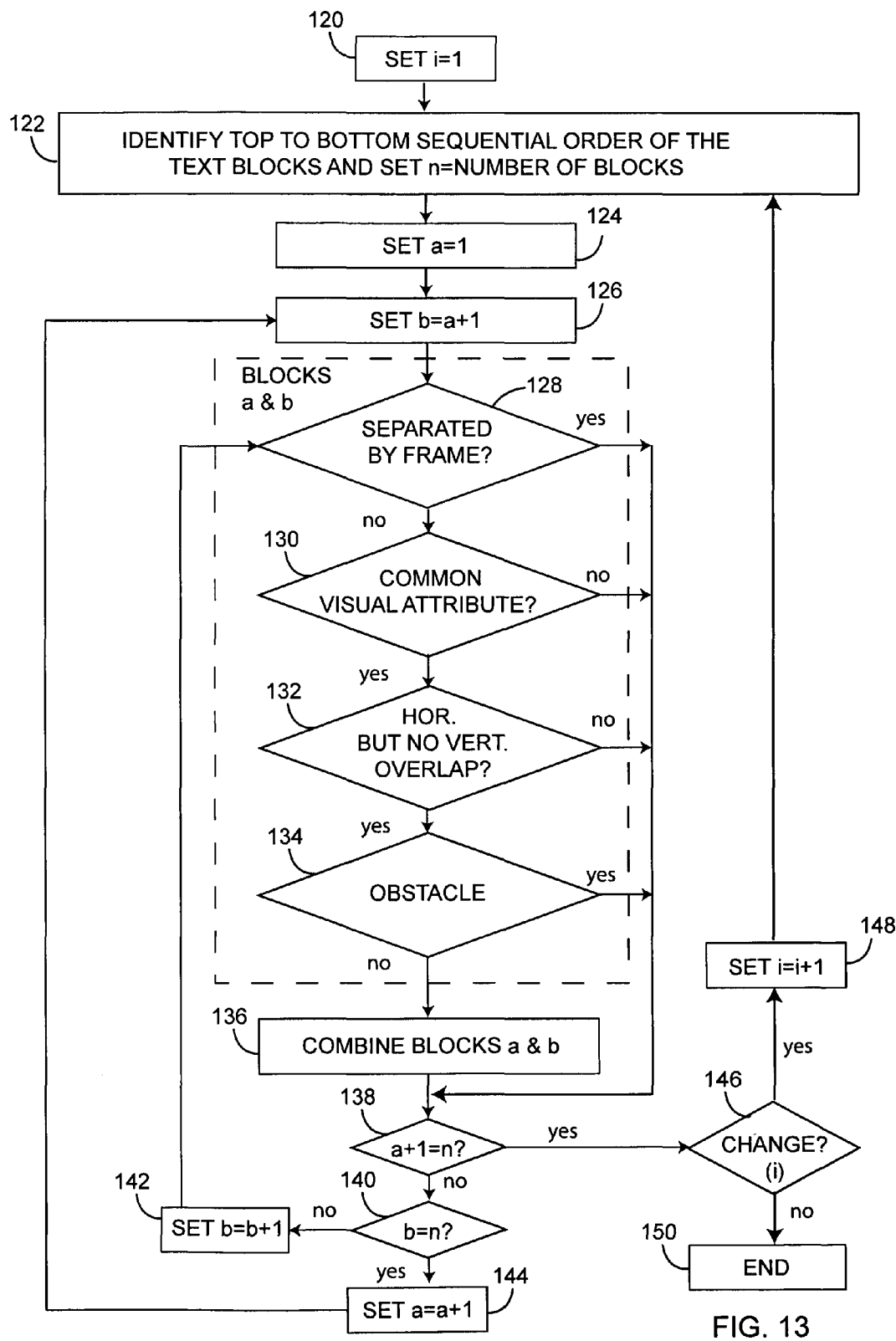
Figure 14:
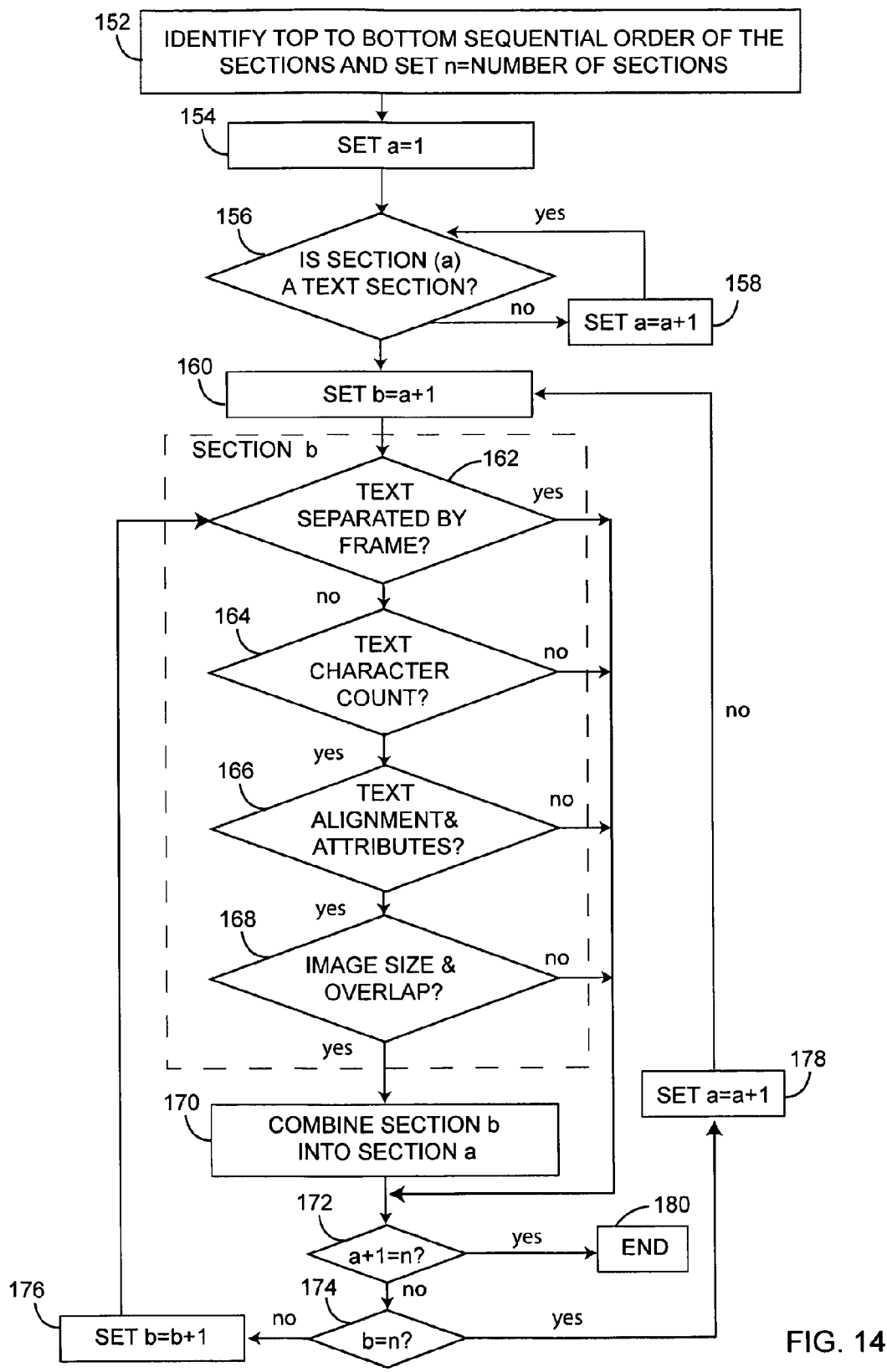

FIGS. 12-14 are flow diagrams depicting steps take to implement various embodiments.

DETAILED DESCRIPTION

Introduction:

A web page often conveys information to a user. That information can include article content the user requested as well as peripheral content such as web site identification, links, and miscellaneous advertisements and reader comments. The article content includes information such as text and images related to a particular subject such as a news story, a recipe, or any other topic requested by a user. In other words, the article content is the primary information intended to be communicated by a web page. Peripheral content is secondary.

Various embodiments described below operate to selectively identify and extract an article from a web page so that it may be produced apart from other portions of the web page. As used herein, producing can include, but is not limited to, printing, displaying, communicating, and electronically storing. In operation, a web page is examined to identify blocks and frames. Text blocks that are not separated by a visual frame and that share common visual attributes are assembled into sections. Following a set of rules, text and image sections are selectively assembled into article candidates. The article candidates are examined to distinguish article content from non-article content. The article content is then produced.

Figure 1:
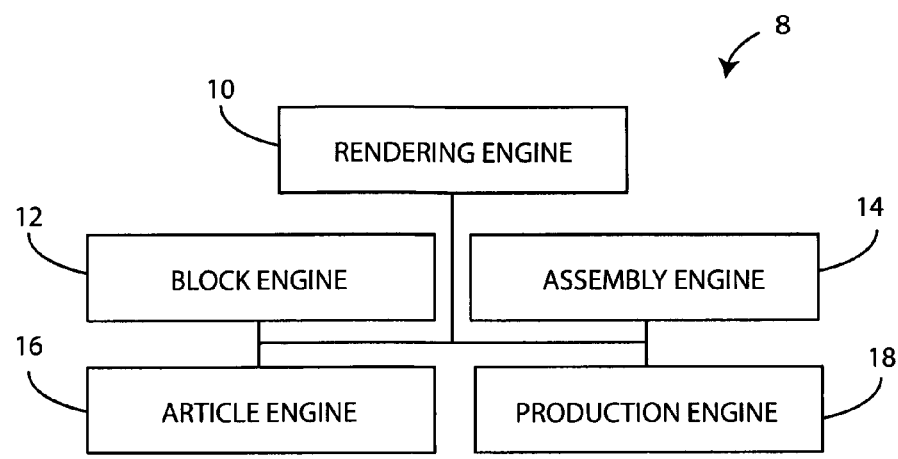
FIG. 1 depicts a selective content extraction system according to an embodiment.

Components:

FIG. 1 depicts physical and logical components that function as a system 8 for selectively extracting and web content according to an embodiment. System 8 is configured to extract the content that makes up an article intended to be conveyed by the web page. As noted, the web page may include other peripheral content such as advertisements and user comments not directly related to the subject matter of the article. System 8 is shown to include rendering engine 10, block engine 12, assembly engine 14, article engine 16, and production engine 18. As system components 10-18 are described, reference will be made to FIGS. 2-10 to provide an example of the operation of each component.

Rendering engine 10 represents generally any combination of hardware and programming for rendering a web page. A web page, in file form, is made up of a series of instructions identifying content as well as defining the placement of that content in a visual display. An HTML (Hyper-Text Markup Language) document is an example of a web page in file form. The content may be included within the HTML document or the instructions may include references (resource locators) for retrieving the content. Rendering engine 10 is responsible for generating a content layout that defines the relative size position of web page's contents as if it were to be shown on a display. The layout can also identify visual attributes such as font, color, size, and alignment. That layout can then be used the other components 12-18 to recognize the content and relative placement.

Figure 2:
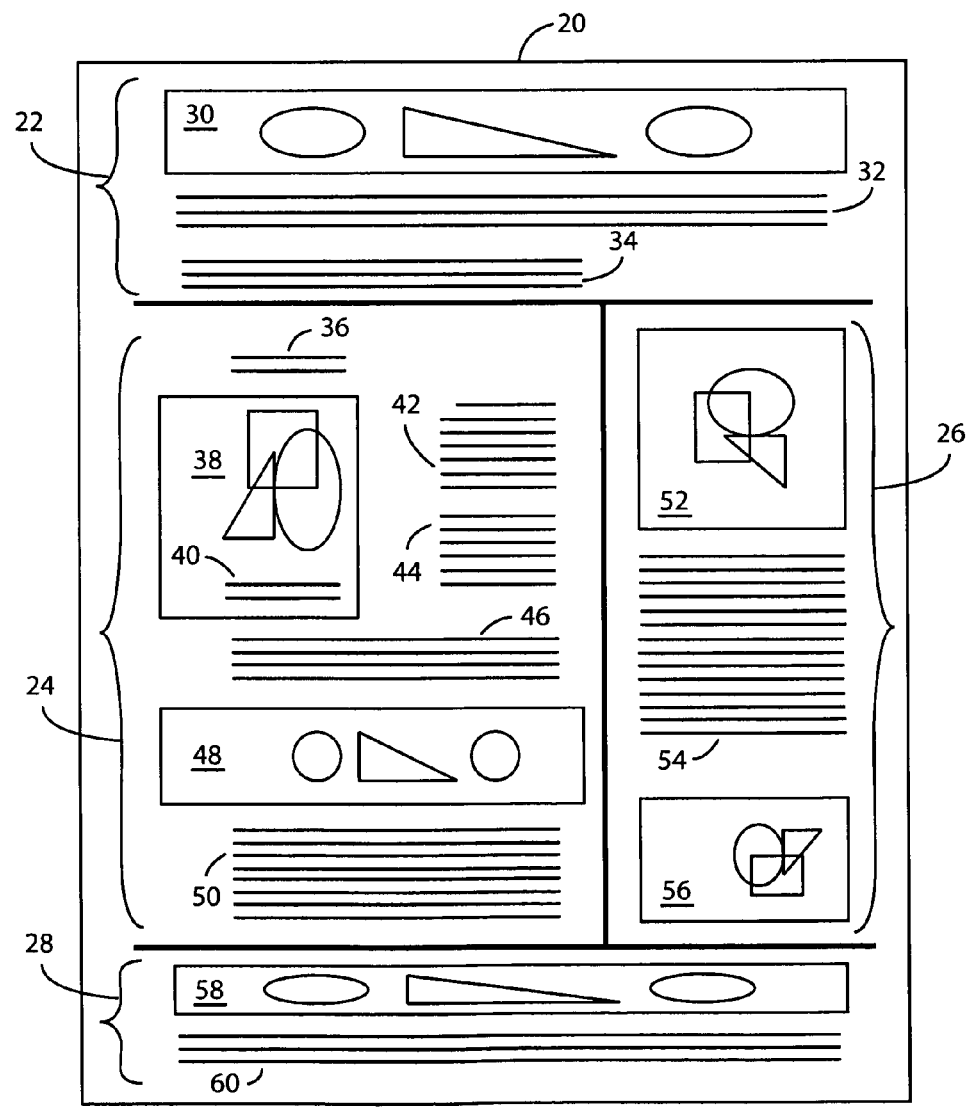
FIG. 2 depicts a web page format according to an embodiment.

FIG. 2 depicts web page 20. While the format shown is only an example, it includes common items such as header 22, article 24, column 26, and footer 28. In the following discussion, web page 20 is used as an example to illustrate various implementations. However, implementation is not limited to the particular format of web page 20. Header 22 is shown to include image and text content 30, 32 and 34. As an example, image content 30 may be a banner advertisement or a logo for a web site from which web page 10 originated. Text content 32 and 34 may include web site navigation links, a web site title, and even a title of an article. Article 24 is shown to include text and image content 36-50 related to a particular subject of interest. Examples include, but are not limited to, news stories, building plans, and recipes. Text and image content 36-50 may also include inline advertisements and other peripheral content not directly related to the article content. Column 26 is shown to include image and text content 52-56 which often include advertisements and links related or unrelated to the content of article 24. Footer 28 is shown to include image and text content 58 and 60 which may include data identifying the web site, navigation links for the site and advertisements. Note that content 30-60 of web page 20 are visible that to the user when web page 20 is displayed. Web page 20 may well include other content that is not visible.

Blocks:

Block engine 12 represents generally any combination of hardware and programming for identifying blocks within a web page. A block is a visible region of a rendered web page that contains a visually distinct portion of the web page's content. A visually distinct portion is a portion of a web page that, when the web page is displayed, can be seen by a viewer. A block is defined by its contents, visual attributes, if any, of the contents, and its relative size and position with respect to other blocks. Block engine 12 identifies image and text blocks. As the name suggests, an image block is a region bounding an image while a text block is a region bounding text. As will be discussed in more detail below, block engine 12 is responsible for distinguishing each identified text block as one of the following types: HEADER, PARAGRAPH, LISTITEM, and QUOTE.

As illustrated in FIG. 2, a block can be represented by a rectangular border that surrounds the block's contents. In performing its function, block engine 12 relies on rendering engine 10. In particular, when rendering an HTML file, rendering engine 10 may generate a DOM (Document Object Model) representation of the web page as well as a layout defining the relative size and position of the content Block engine 12 can identify a block's type, for example, by examining the DOM and identifying tags indicative of text and images. As discussed in more detail below, different text tags are indicative of different text types. The tag "blockquote" for example, can identify a QUOTE block. Block engine 12 can identify the size and position by examining the layout.

Figure 3:
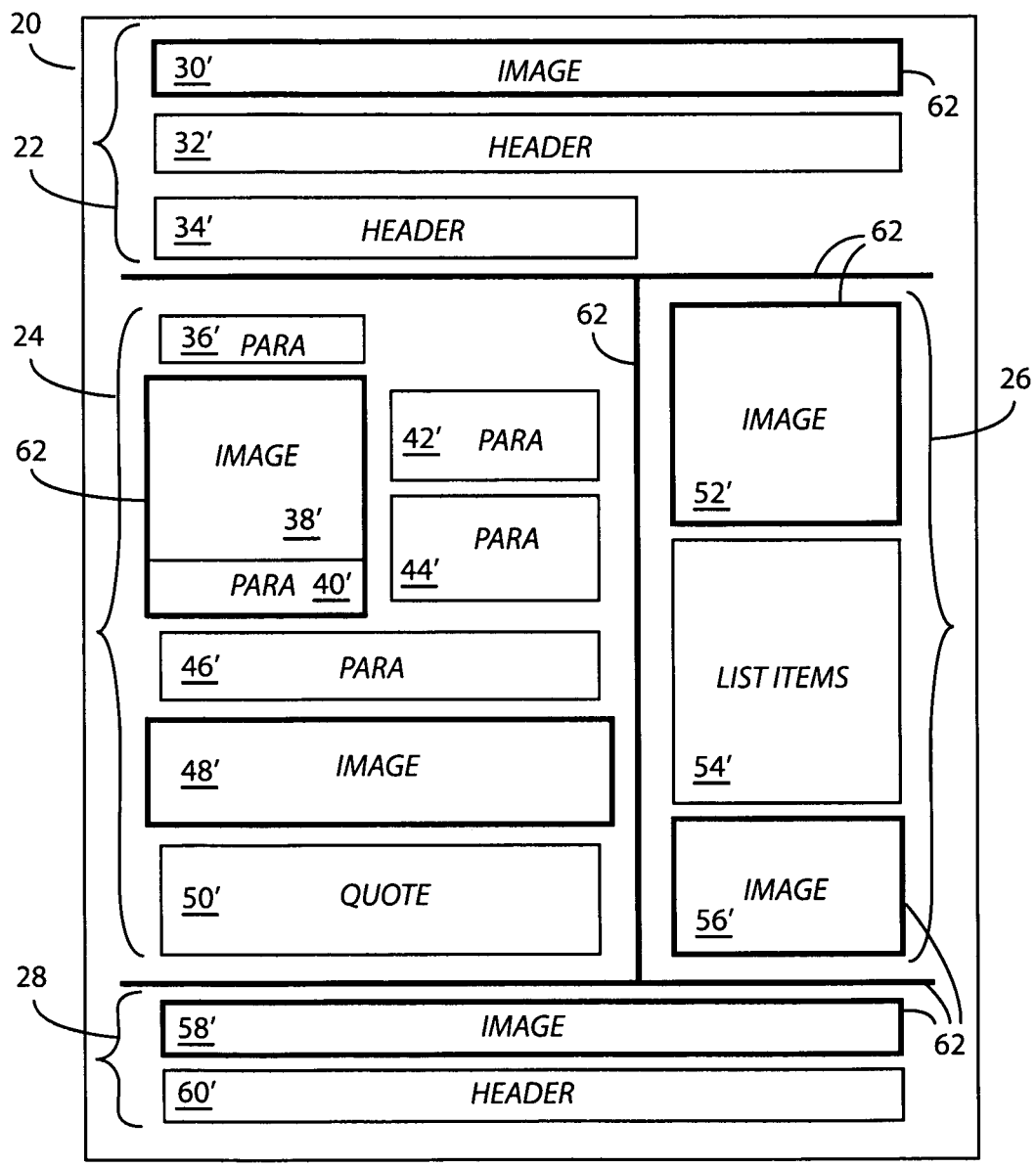
FIG. 3 depicts the web page segregated into visual blocks according to an embodiment.
Figure 4:
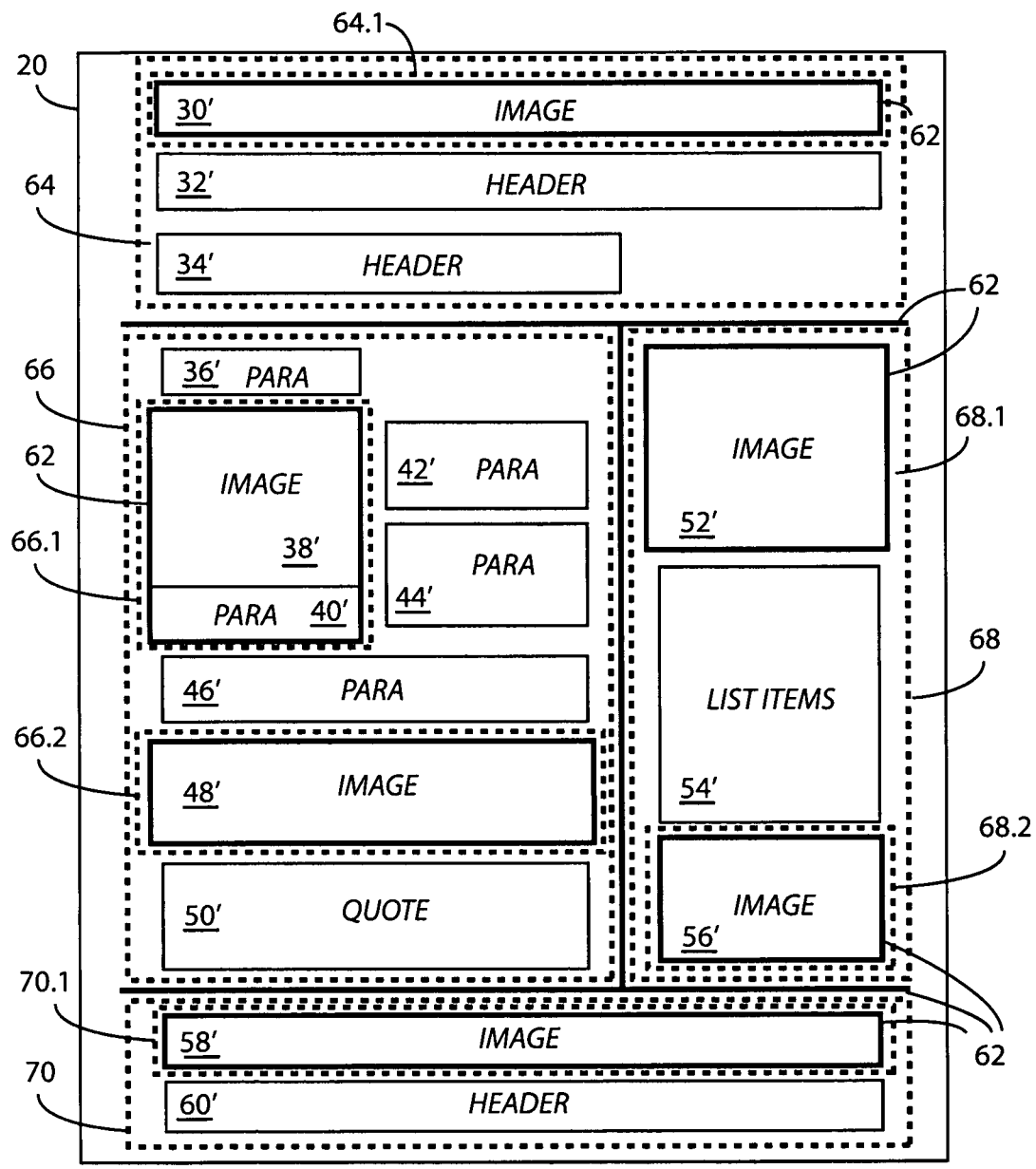
FIG. 4 depicts the web page segregated into visual blocks and into visual frames according to an embodiment.

Moving to FIG. 3, for illustration, block engine 12 has segmented web page 10 into blocks 30'-60'. Each block 30'-60' represents text or an image that would be visible to a user if the web pager were displayed. Each text block is assigned a type of HEADER, PARAGRAPH, QUOTE or LISTITEM. As one can see, each block is represented by a rectangle bounding the block's content and whose relative size and position can be discerned. From the perspective of block engine 12, identifying image blocks as compared to text blocks is less complex.

Examining an HTML document or a DOM, images have a readily discernable size and, often, a readily known position. Identifying a text block, however, can take some additional effort. A text block is consecutive text segment followed by a line break. A text block may span multiple DOM nodes. The most common content type is paragraph. Accurate visual information for paragraphs may not be readily available from the DOM for a number of reasons. Nodes of free-flow text (with tag "#text") are not HTML elements and no visual attributes can be retrieved from them. In the case that a paragraph is created by a free-flow text node followed by a "br" node, no precise visual properties (such as bounding box location) can be retrieved from the paragraph. Even for well-structured web pages in which every paragraph has the "p" tag containing a single free-flow text node, location information may not reflect the paragraph's true location and the size of the bounding box. A paragraph may be represented by many possible tags (such as "p", "div", and "td") and may contain words or phrases decorated by "em", "strong", "it", etc., making it nontrivial to recognize. Thus, block engine 12 wraps all leaf text nodes in the DOM with a new and unique tag such as "txt". This effectively turns all leaf text nodes into HTML elements.

Note that if an HTML element is invisible to users. Block engine 12 excludes it from consideration. Whether an element is actually visible may be determined by the visibility, display and overflow attributes of the associated style element (IHTMLCurrentStyle for MSHTML). Even for an HTML element whose visibility is not "hidden" and display is not "none", block engine 12 may check the bounding boxes of all ancestor nodes and their overflow attributes to determine if the displayed dimension of the HTML element is actually non-zero and visible.

As noted, a text block can include multiple DOM nodes. Block engine 12 traverses the DOM tree in the depth-first order, accumulating visual attributes of nodes it previously wrapped with the new and unique tag ("txt" for example) along the way until encountering a block element or a "br" node. An html element is a block element if its display style is "block".

As noted, block engine 12 distinguishes text blocks into four types—PARAGRAPH, QUOTE, LISTITEM, and HEADER. Such a division helps account for visual and spatial layout differences between text blocks. For example, block engine 12 may assign QUOTE to text paragraphs under nodes of the "btockquote" tag. Such text blocks often differ with regular paragraphs in font size, color and background color, and have extra margins on both sides. Block engine 12 identifies lists by verifying a) the existence of bullets based on a valid attribute of "listStyleType", "listStyleImage" or "backgroundImage", and b) consistent vertical alignment on the left or the right side. Once such a list is identified, text blocks under "li" nodes are assigned the type of LISTITEM. HEADER is assigned to text blocks under nodes with tags "H1-H6". It is also noted that block engine 12 ensures that text blocks are associated with visual attributes such as: font size, font name, text color, background color, text alignment, regular character count, link character count and bold character count.

Sections and Article Candidates:

Continuing with FIG. 1, assembly engine 14 represents generally any combination of hardware and programming configured to selectively assemble text blocks into sections and to assemble sections into article candidates. As inferred, a section is a collection of text blocks sorted in top to bottom (vertical) order. The text blocks are assembled into sections according to a set of rules (examples of which are discussed below). The rules are selected to help ensure that the assembled blocks are visually and semantically related. Assembly engine 14 then selectively combines sections into article candidates following a second set of rules. An article candidate is a section or a collection of sections that may include article content that is to be produced apart from the remainder of the web page.

In operation, assembly engine 14 identifies frames separating the blocks. A frame is made up of visible lines that surround one or more blocks. A horizontal line created by the "hr" tag is relatively easy for assembly engine 14 to detect. Beyond that, assembly engine 14 can detect vertical and horizontal lines by examining the visual properties (borderStyle, borderWidth and borderColor of an IHTMLCurrentStyle object) of visible HTML elements. An HTML element has a frame if four border lines are detected. For all remaining lines, assembly engine 14 puts them in a poll and recognizes frames created by the lines. Assembly engine 14 may also perform image analysis to detect frames created by background images.

Referring again to FIG. 3 for illustration, assembly engine 14 has identified visible lines 62. In this example, some of visible lines 62 separate header 22, article 24, column, 26, and footer 28. Others border image blocks 30', 38', 48' 52', 56', and 58'. Assembly engine 14 has identified frames defined by visible lines 62. Visible lines separating sections 22, 24, 26, and 28 (FIG. 3) define frames 64, 66, 68, and 70 shown in FIG. 4. Visible lines bordering image blocks 30', 38', 48' 52', 56', and 58' define frames 64.1, 66.1, 66.2, 68.1, 68.2, and 70.1. Note that frame 64.1 is located entirely within frame 64. Frames 66.1 and 66.2 are located within frame 66. Frames 68.1 and 68.2 are within frame 68, and frame 70.1 is within frame 70.

With frames identified, assembly engine 14 assigns a frame identifier to each block identified by block engine 12. Frame indenters are assigned such that blocks not separated by a frame share a common identifier and blocks separated by a frame have differing identifiers. Looking at FIG. 4, blocks within given one of frames 64, 66, 68, and 70 will have identifies that differ from the blocks within the other frames. Within a given frame such as frame 66, blocks 36', 42', 44', 46', and 50' will share a common identifier that differs from the identifier assigned to blocks 38' and 40' and another identifier assigned to block 48'.

Referring back to FIG. 1, with frame identifiers assigned, assembly engine 14 selectively assembles text blocks into sections. Continuing with the example above, assembly engine 14 focuses on text blocks with identified types PARAGRAPH, QUOTE, and LISTITEM. The main purpose of this step is to form larger regions with similar visual and semantic properties. Upon determining that certain criteria are met, assembly engine 14 will group two text blocks into a larger section. To meet the criteria, assembly engine 14 may require that two text blocks under consideration overlap horizontally but not vertically. Further, assembly engine 14 may require that the space between the two blocks be free of any "obstacle." An obstacle is a block that is completely contained within the space between the blocks under consideration. Moreover, for a text block to become an obstacle it must have the same frame identifier as the two blocks in consideration. To be grouped, the two blocks may be required to share a common frame identifier and common visual attributes such as font, size, text color, background color, and text alignment. Assembly engine 14 may also require that the two text blocks be for the same type, that is, PARAGRAPH, QUOTE, or LISTITEM.

Assembly engine 14 applies the criteria and groups text blocks using an iterative process. Assembly engine 14, using a vertical top-down order compares a given text block sequentially with all subsequent text blocks to determine if the criteria as to those two blocks are met and repeats for each subsequent text block. Assembly engine 14 repeats until no change occurs—that is—until no text blocks can be combined. All remaining blocks (image and text) are identified as "one block" sections.

Figure 5:
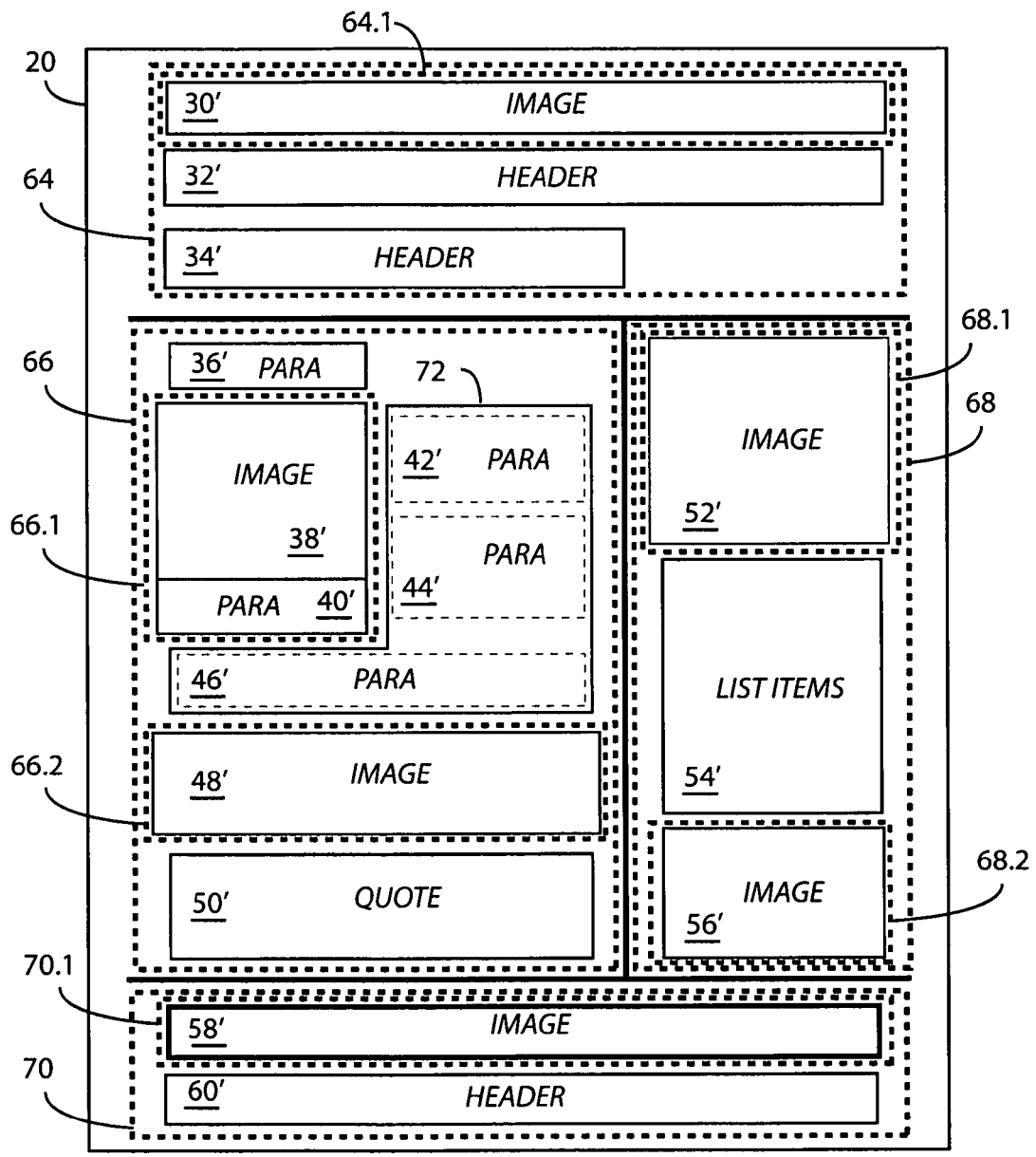
FIGS. 5-6 depict the web page with visual blocks being iteratively grouped according to an embodiment.
Figure 6:
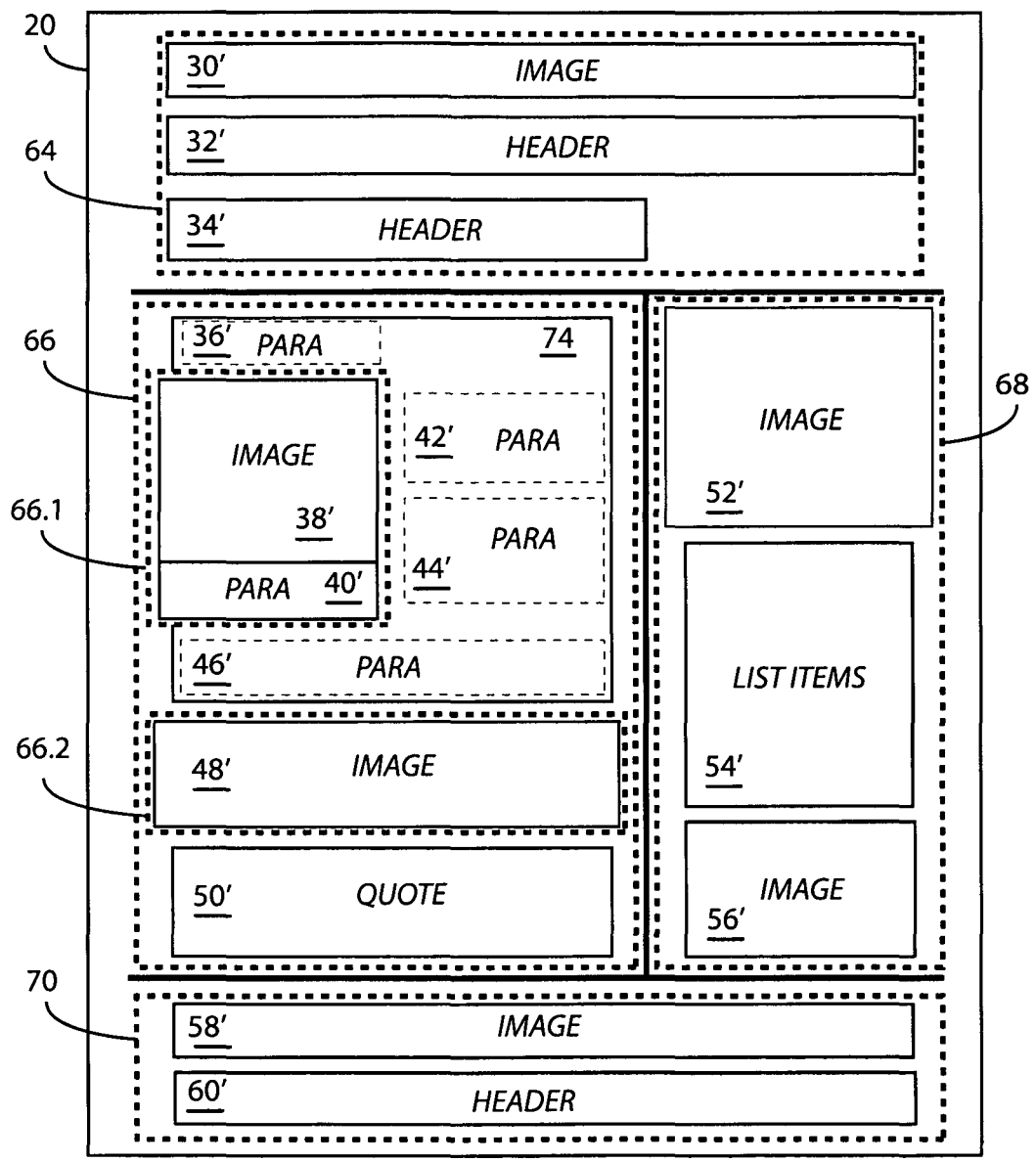

FIGS. 5-6 help to illustrate the grouping of blocks into sections. Looking at FIG. 5 and in particular the contents of frame 66. Text block 36' has not been grouped with text block 40' because they have differing frame identifiers. Text block 36' has not been grouped with text block 42' because they do not share a partial horizontal overlap. Text block 36' is not grouped with text block 46' or 50' because text blocks 42' and 44' are obstacles that is contained completely in the space between text blocks 36' and 50'. Note that blocks 38', 40' and 48' are not obstacles because they have frame identifiers that differ from text block 36'. Text blocks 42', 44', and 46' share a common frame identifier and at least a partial horizontal overlap with one another. With the lack of obstacles and the assumption that the text blocks also share a common type and visual attributes, text block 42' has been grouped with text block 44'. That combination has subsequently been grouped with text block 46' to create section 72. Assuming that text block 50' is of a different type than that of the blocks of section 72, it is not combined.

With the creation of section 72, text block 36' shares at least a partial horizontal overlap. Following the iterative process, assembly engine 14 assembles text block 36' into section 72 to create section 74 as shown in FIG. 5. At this point, no text blocks within frame 66 remain to be combined. Note that image block 38', text block 40' and text block 50' are each identified as one block sections. Also note that, while not addressed explicitly, assembly engine 14 applies the same process to the contents of frames 64, 68, and 70.

In addition to assembling text blocks into sections, assembly engine 14 is also responsible for assembling sections into article candidates. An article candidate is a section or group of sections that may include article content. Article content is the primary information intended to be communicated by a web page. Such information can include text and images. Supplementary information such as advertisements and controls for navigating a web site can be considered to be peripheral or secondary content. A more complex article, such as that illustrated in FIGS. 2-10, will have text blocks with differing text types (PARAGRAPH, QUOTE, or LISTITEM). Further, an article can include sections having differing visual attributes such as a main body and a title as well as images not surrounded by text. Assembly engine 14 is then responsible for combining such heterogeneous sections upon a determination that certain criteria are met.

Assembly engine 14, for example, considers sections for grouping following a top to bottom order. To be grouped, an assembly engine 14 may require that a section meet one or more criteria. Following a top to bottom order, assembly engine 14 may skip ahead and start with the first section containing text of the type PARAGRAPH. The remaining rules can include requiring that a subsequent section under consideration must be an image section or a text section of the type PARAGRAPH, QUOTE, or LISTITEM. A text section may be required to have a character count that exceeds a threshold. The text section's left or right margin may be required to substantially align with the left or right margin of other sections that are to be included in the article candidate. Text sections in general may be required to have the same frame identifier. PARAGRAPH sections (that is, sections containing blocks of the type PARAGRAPH) may be required to have the same visual attributes as previous PARAGRAPH sections while text sections of other types (QOUTE and LISTITEM) are not. To be combined, an image need not share a common frame identifier but may be required to have a size that exceeds a minimum threshold and to share at least a partial horizontal overlap with the other section or sections to be included in the article candidate.

FIGS. 6-8 help to illustrate the combining of sections into article candidates. Focusing on the contents of frame 66, one can presume that text sections 74 and the one block text section made from block 50' each have a character count that exceeds a threshold and that the image sections made up of blocks 38' and 48' each exceed a minimum size. Further the left margins of all sections within frame 66 blocks are substantially aligned. As a result, all sections solely within frame 66 have, in FIG. 7, been combined into article candidate 76. Because they are of sufficient size and are overlapped horizontally by other sections combined into candidate 76, image blocks 38' and 48' have also been included even though they are separated by from the other sections by frames 66.1 and 66.2 (FIG. 6). The one-block section defined by block 40' is excluded as it is of the type PARAGRAPH and separated from the other sections by frame 66.1 (FIG. 6). Thus, the section represented by block 40' is identified as article candidate 77. Note that by distinguishing article candidate 77, it can be later identified as including a caption for image 38.

Comparing FIGS. 7 and 8, sections within frames 64, 68, and 70 have been combined into article candidates 78, 80, and 82. Sections within frames 66 and 68 are not combined with one another as they do not share a common left or a common right margin. Sections within frames 66 and 64 are not combined with one another as they either do not share common visual attributes or the text sections within frame 64 or are not of the type PARAGRAPH, QUOTE, or LISTITEM. The same can be said for frames 66 and 70.

Instead of or in addition to the criteria listed above, assembly engine 14 may use visual horizontal lines to determine whether or not to combine sections into article candidates. To be considered, a horizontal line may be required to be of a length that is substantially equal the maximum width of the sections it separates. A line that meets the length equipment will prevent a separated text section from being combined with another section if that text section has a character count that does not exceed a minimum threshold. That line will prevent an image section from being combined if the image section is smaller than a minimum size. Further, assembly engine 14 may set a maximum number of such lines that may be encountered following a top to bottom examination after which it no longer combines sections into article candidates.

Article Content:

Referring again to FIG. 1, article engine 16 represents generally any combination of hardware and programming for distinguishing article candidates that include article content from those that do not include article content. In a particular implementation, article engine 16 examines article candidates recognized by assembly engine 14 to identify an article body. Article engine 16 also identifies an article title, and captions for images included in the article body.

To identify an article body in a particular implementation, article engine 16 examines the article candidates to identify the article candidate that occupies a large region, close to the center and top, of the layout of the web page. In doing so, article engine 16 may compute a numerical value for each article candidate using the following formula.

$$A = \text{Area}(1 - \text{top}/2000) \times (1 - |c_m - c_w|/W)$$

Area is the area occupied by all blocks included in the given article candidate, top is the topmost position, and $c_w$ is the horizontal centroid of the layout while $c_m$ is the horizontal centroid of the region occupied by the article candidate. W is the width of the layout. It is noted that the top most position has a zero coordinate. In this example, article engine 16 assumes the top position will not fell below 2000. Article engine 16 selects the article candidate with largest A value as the article body.

Once the article body is identified, article engine 16 has information about the location and the font of the main text. In searching for the title, article engine 16 may use the following criteria. First, the top of the title may be required to not be lower than the top of the article body. The title font size may be required to not be smaller than the font size of the main text. HEADER block takes higher precedence. If no HEADER block is found, PARAGRAPH blocks are considered. For all eligible candidates, article engine computes a metric of weighted font size. The weighting factors take into account the type of HTML tag ("h1" is given higher weight than "h2" to "h6"), and whether the title is aligned to main text and if the title is within the same frame as the main text.

With the article body and title identified, article engine 16 can, identify captions for images included in the article body. It is noted that block and assembly engines 12 and 14 have taken steps to separates image captions from main article text. Thus, article engine 16 excludes text from the article body from its search for captions. Instead, article engine 16 may identify an article candidate as including a caption only if it includes text of a font size that does not exceed the font size of the article body, and it is positioned immediately adjacent to an image within the article body.

FIGS. 8-10 help to illustrate article candidates being distinguished as including article content. Looking at FIG. 8, one can visually detect that article candidate 76 occupies a large region, close to the center and top, of the layout of the web page and would have the largest "A" value using the equation above. As a consequence article candidate 76 is identified as the article body in FIGS. 9 and 10. Because it is included in article candidate 76 and due to its proximity to image 38, the one block section defined by text 40 is identified as a caption for image 38.

The difference between FIGS. 9 and 10 lies in which block (36' or 34') is identified as the article title. In FIG. 9, one can presume that the text 36 is of a larger font size than that of text 40, 42, 44, 46, and 50. Further, text 36 may be of the type HEADER. Due to its immediate proximity to the remainder of the contents of candidate 76, article engine identifies text 36 as the title. Looking at FIG. 10, one can presume that text 36 is of the same size as the remainder of the text of candidate 76. However, text 34 may be if the type HEADER. Thus, while located in a different frame, text 34 may be identified as the article title due to style and its close proximity to candidate 76.

Production engine 18 represents generally any combination of hardware and programming for producing only the article candidates distinguished by article engine 16 as including article content. As noted above, such content can be produced in a number of manners including printing, displaying on a monitor, communicating via e-mail or web page, and electronically storing in a file. Note that while the produced text and images of FIGS. 9 and 10 have a layout corresponding to that of web page 10 of FIGS. 2-9, the layout can differ. Production engine 18 will generally cause the title to appear first. The text and images of the article body can be repositioned as desired with the captions appearing adjacent to their corresponding images.

System 8 of FIG. 1 may be implemented in a number of environments such as environment 84 of FIG. 11. Environment 84 includes client device 86, server devices 88 and 90, printer 92, data repository 94, and display device 96. Client device 86 represents generally any computing device for obtaining and processing web content. For example, client device 86 may be a desktop computer, a laptop computer, a smart phone. Server device 88 represents generally any computing device or devices for serving web pages to client device 86. Server device 90 represents generally any computing device or devices for serving remote applications to client device 86. Printer 92 represents generally any image forming device for producing printed images. Data repository 94 represents generally any service for storing electronic data for later retrieval and use. Display device 96 represents generally any device such as a computer monitor or television for displaying desired images.

Link 98 interconnects client device 96 with devices 88-96. Link 98 represents generally one or more of a cable, wireless, fiber optic, or remote connection via a telecommunication link, an infrared link, a radio frequency link, or any other connector or system that provides electronic communication. Link 98 may represent an intranet, the Internet, or a combination of both. The paths followed by link 98 between client device 86 and devices 88-96 as depicted in FIG. 11, represent the logical communication paths between these devices, not necessarily the physical paths between the devices.

In the example of FIG. 11, client device 86 includes processor 100 and memory 102. Processor 100 represents generally any device for executing program instructions stored in memory 102. Memory 102 represents generally any memory configured to store program instructions (programming) that, when executed, cause processor 100 to attempt to identify and produce article content to the exclusion of other web page content or cause processor 100 to request that a remote application executed by server device 90 do the same.

Memory 102 is shown to include OS (operating System) 104, drivers 106, and browser 108. OS 104 represents generally any software platform on top of which other programs or applications such as drivers 106 and browser 108 run. Examples include Linux® and Microsoft Windows®. Drivers 106 represent generally any program instructions that when executed control the operation of printer 92, data repository 94, and display device 96. In particular drivers 106 serve and translators for OS 104 and browser 108. Drivers 106 translate generic commands received from OS 104 and browser 108 into device specific commands capable of being utilized by peripheral devices 92, 94, and 96. Browser 108 represents generally any program instructions that when executed operate to retrieve a web page from server device 88 through use of drivers 106 operate to cause the web page or a portion thereof to be produced by one or more of peripheral devices 92-96.

As noted above, the various components of system 8 of FIG. 1 include combinations of hardware and programming. With respect to FIG. 11, the hardware components may be implemented though processor 100 and for server device 90. The programming elements may be implemented as parts of OS 104, drivers 106, browser 108, and/or programming executed by server device 90.

Operation:

FIGS. 12-14 are exemplary flow diagrams of steps taken to implement various embodiments. In discussing FIGS. 12-14, reference may be made to the diagrams of FIGS. 1-11 to provide contextual examples. Implementation, however, is not limited to those examples. Starting with FIG. 12, blocks are identified within a web page (step 110).

Referring back to FIG. 1, block engine 12 may be responsible for implementing step 110. As previously discussed, a block is a visible region of a rendered web page that contains a visually distinct portion of the web page's content. A block is defined by its contents, visual attributes, if any, of the contents, and its relative size and position with respect to other blocks. In the example of FIG. 3, page 10 has been segmented into blocks 30'-60'.

The blocks are selectively assembled into sections (step 112). Referring back to FIG. 1, assembly engine 14 may be responsible for implementing step 114. A section, as noted earlier, can be a collection of text blocks sorted in a top to bottom (vertical) order. The text blocks are assembled into sections according to a set of rules. A detailed example of such rules is discussed below with respect to FIG. 13. In general, step 112 involves identifying frames within the web page. A frame is identified by visible lines that surround one or more blocks. Only those blocks not separated by a frame may be combined into a section. In the example of FIG. 5, frames 64, 66, 68, and 70 have been identified. Frame 66, for example, includes sub-frames 66.1 and 66.2. Following a particular set of rules, blocks 36', 42', 44', and 46' have been combined to form section 74. Frame 66 is also shown to include a one-bloc section made up from block 50'. Sub-frame 66.1 includes one-block sections made up of blocks 38' and 40'. Sub-frame 66.2 includes a one-block section made up of block 48'.

Continuing with FIG. 12, the sections are selectively assembled into article candidates (step 114). Referring to FIG. 1, assembly engine 14 may be responsible for implementing step 114. An article candidate is a section or group of sections that may include article content. Article content is the primary information intended to be communicated by a web page. Such information can include text and images. Supplementary information such as advertisements and controls for navigating a web site can be considered to be peripheral or secondary content. In step 114, the sections may be selectively assembled according to a set of rules. A detailed example of such rules is discussed below with respect to FIG. 14. In the example of FIG. 8, article candidates 76, 77, 78, 80, and 82 have been assembled.

Article candidates that include article content are distinguished from article candidates that do not include article content (step 116). As described above, article content is the primary information intended to be communicated by a web page. Article content can include a title, an article body that includes text and images, and captions for images included in the article body. The article candidate that occupies a larger area near a top and center of the web page than other article candidates may be distinguished as including the article body. The article candidate that includes a text block positioned no lower than the top of the article body and has a text size that is no smaller than that of the article body may be identified as including the title. Weight may be given to text blocks of the type HEADER and whether or not a given text block is separated from the article body by a frame. A text section that is not included in the article body but that is positioned adjacent to an image of the article body may be distinguished as a caption for that image.

Referring to FIG. 1, article engine 16 may be responsible for implementing step 116. Looking at FIGS. 8-10. Article candidate 76 has been identified as including the article body. Candidate 77 has been identified as including a caption for an image included in the article body. In FIG. 9, candidate 76 is identified as including the title (block 36') while in FIG. 10, candidate 78 is identified as including the title (block 34').

Content is produced only from the article candidates that include article content (step 118). Step 118 can include producing the title, the article body, and any captions. As noted, producing can include, but is not limited to, printing, displaying, communicating, and electronically storing. Referring to FIG. 1, production engine 18 may be responsible for implementing step 118. Looking to FIGS. 9 and 10, the title, article body and caption have been produced to the exclusion of the other content of web page 10 (FIGS. 2-9). Note that while the produced text and images of FIGS. 9 and 10 have a layout corresponding to that of web page 10 of FIGS. 2-9, the layout can differ. Production engine 18 will typically cause the title to appear first. The text and images of the article body can be repositioned as desired with the captions appearing adjacent to their corresponding images.

FIG. 13 is a flow diagram depicting an example of steps taken to selectively assemble blocks into sections (step 112 of FIG. 12). Referring to FIG. 1, assembly engine 14 is responsible for implementing the steps of FIG. 13. As will become clear, the flow of FIG. 13 is iterative meaning that the process repeats until no more blocks remain to be combined into sections. Initially, a variable (i) is set to one (step 120). The variable (i) represents the current iteration. A top to bottom sequential order of the text blocks is identified and a variable (n) is set to the number of blocks in that order (step 122). Looking at FIG. 3, that order may be as follows: one-32'>>two-34'>>three-36'>>four-42'>>five-44'>>six-54'>>seven-46'>>eight-50'>>nine-60'. Note that, in this example, image blocks are excluded. Also note that where two blocks are positioned at the same height, a preference may be to position the left most or right most block first.

A variable (a) is set to one and a variable (b) is set to (a) plus one (steps 124 and 126). The variables (a) and (b) represent the text blocks under consideration for being combined into a section. The value of a given variable (a) or (b) represents the position of a text block in the order defined in step 122. For text blocks (a) and (b), a series of rules are applied in steps 128-134. Note that the order in which rules 128-134 are applied may be inconsequential. Further, in various implementations, one or more of rules 128-134 may not be used.

In step 128, it is determined if text blocks (a) and (b) are separated by a frame. If they are, the text blocks are not combined and the process skips ahead to step 138. If not separated by a frame, it is determined if the text blocks share visual attributes (step 130). As noted above a text block may be identified as being of the type HEADER, PARAGRAPH, LISTITEM, or QOUTE. Thus the visual attribute determination of step 130 can include a determination as to whether the two text blocks are of the same type. Even where the two blocks share the same type, step 130 can further involve a determination as to whether the text in the blocks share a common font, font size, color, and other visual attributes. If the text blocks do not share common visual attributes (i.e. they differ in type, font, size, color, etc.) the blocks are not combined into a section and the process skips to step 138. Otherwise the process continues with step 132.

In step 132 it is determined if the blocks share a horizontal but not a vertical overlap. Upon a negative determination, that is—no horizontal overlap or a vertical overlap, the blocks are not combined and the process skips ahead to step 138. Upon a positive determination in step 132, it is determined if an obstacle is positioned between text blocks (a) and (b) (step 134). As noted above, an obstacle is a block having the same frame identifier as blocks (a) and (b) that is located in the space between blocks (a) and (b). If an obstacle exists, blocks (a) and (b) are not combined and the process skips ahead to step 138. Otherwise the process continues with step 136.

Assuming blocks (a) and (b) pass all the rules of steps 128-134, the text blocks are combined (step 136). It is determined if the variable (a) plus one equals the variable (n) (step 138). A negative determination indicates that blocks (a) and (b) are not the last two blocks in the order identified in step 122. Upon a negative determination, it is determined if the variable (b) equals the variable (n) (step 146). A negative determination indicates that text block (b) is not the last text block in the order identified in step 122. Upon a negative determination, the variable (b) is incremented by one and the process skips back to step 128. Upon a positive determination in step 146, the variable (a) is incremented by one (step 144), and the process then skips back to step 126.

Looking back to step 138, upon a positive determination, it is determined if there was a change in iteration (i) (step 146). A change occurs if any two text blocks are combined in step 136 for a given value of the variable (i). Upon a positive determination in step 146, the variable (i) is incremented by one (step 148), and the process skips back to step 122 to proceed through a subsequent iteration. Note that when skipping back to step 122, text blocks having been previously combined with one another in step 136 are now treated as a single larger text block. Upon a negative determination in step 146, the process ends (step 150). At this point, the text blocks have been assembled into one or more sections.

FIG. 14 is a flow diagram depicting an example of steps taken to selectively assemble sections into article candidates (step 114 of FIG. 12). Referring to FIG. 1, assembly engine 14 is responsible for implementing the steps of FIG. 14. A top to bottom sequential order of the sections is identified and a variable (n) is set to the number of sections in that order (step 152). A variable (a) is set to one, and a variable (b) is set to (a) plus one (steps 154 and 156). The variables (a) and (b) represent the text blocks within the identified order. An initial goal is to locate the first text section. A text section is a second made up of text blocks. Thus, it is determined if section (a) is a text section (step 156). If not, the variable (a) is incremented by one (step 158), and the determination of step 156 is repeated. Upon a positive determination, the variable (b) is set to equal the variable (a) plus one (step 160).

The value of a given variable (a) or (b) represents the position of a section in the order defined in step 122. For sections (a) and (b), a series of rules are applied in steps 162-168. Note that images are identified as single block sections and only text and image sections are considered. Also, the order in which rules 162-168 are applied may be inconsequential. Further, in various implementations, one or more of rules 162-168 may not be used.

In step 162, it is determined if sections (a) and (b) are text sections separated by a frame. Upon a positive determination, the sections are not combined and the process skips ahead to step 172. Otherwise, it is determined if sections (a) and (b) are text sections that both have a character count exceeding a threshold (step 164). Upon a negative determination with respect to the character count, the sections are not combined and the process skips ahead to step 172. Otherwise, it is determined if sections (a) and (b) are text sections that share an alignment and visual attributes such as font, font size, and color (step 166). Upon a negative determination as to alignment or attributes, the sections are not combined and the process skips ahead to step 172. It is noted that only text sections assembled from block of the type paragraph may be required to share common visual attributes. The alignment requirement can be satisfied if either the left margin or the right margin of text sections (a) and (b) are in substantial alignment. Upon a positive determination in step 166, it is determined if section (b) is an image section that exceeds a threshold size and shares at least a partial horizontal overlap with section (a). Upon a negative determination, the sections are not combined and the process skips ahead to step 172.

Assuming sections (a) and (b) pass all the rules of steps 162-168, the sections are combined (step 170), it is determined if the variable (a) plus one equals the variable (n) (step 172). A negative determination indicates that sections (a) and (b) are not the last two sections in the order identified in step 152. Upon a negative determination, it is determined if the variable (b) equals the variable (n) (step 174). A positive determination indicates that section (b) is the last section in the order identified in step 122. Upon a negative determination, the variable (b) is incremented by one (step 176) and the process skips back to step 162. Upon a positive determination in step 174, the variable (a) is incremented by one (step 178), and the process then skips back to step 160. Finally, upon a negative determination in step 172, the process ends (step 180).

CONCLUSION

FIGS. 1-11 aid in depicting the architecture, functionality, and operation of various embodiments. In particular, FIGS. 1 and 11 depict various physical and logical components. FIGS. 2-10 depict an example of article content being identified and produced to the exclusion of other web page content. Various components illustrated in FIGS. 1 and 11 are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIG. 12-14 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A computer readable medium having processor executable instructions stored thereon, the instructions when executed cause the implementation of a method for producing web page content, the method comprising:
    identifying blocks within a web page;
    selectively assembling the blocks into sections, by:
        identifying one or more frames within the web page, each frame encompassing one or more of the blocks; and
        grouping the blocks into sections such that each section just includes blocks that are not separated by a frame;
    selectively assembling the sections into article candidates;
    distinguishing an article candidate that includes article content from article candidates that do not include article content; and
    producing content just from the article candidate distinguished as including article content.

2. The medium of claim 1, wherein the blocks include text blocks arranged in a top to bottom order within the web page and wherein grouping comprises:
    combining a text block with a subsequent text block within the order only if the two visual text blocks are not separated by a frame, have no vertical overlap, share at least a partial horizontal overlap, and share a common visual attribute; and
    following the top to bottom order, iteratively repeating the combining until no text blocks can be combined.

3. The medium of claim 1, wherein selectively assembling the sections into article candidates comprises, following a top to bottom order, combining a section with a previous section in the order upon a positive determination of one or more the following:
    the section is a text section with a character count that exceeds a minimum threshold and has a left or right margin that is aligned with the left or right margin of the previous section;
    the section is a text section sharing visual attributes of the previous section. and
    the section is an image section having a size exceeding a threshold size and shares at least a partial horizontal overlap with the previous section.

4. The medium of claim 1, wherein selectively assembling sections into article candidates comprises combining text and image sections separated by horizontal lines into article candidates, wherein combining includes:
    detecting horizontal lines between sections; and
    preventing two sections separated by a detected horizontal line from being combined if that horizontal line has a length that is equal to a greater of the widths of two sections and either one of the two sections is a text section that does not have a character count that exceeds a threshold or one of the two sections is an image section whose size does not exceed a threshold size.

5. The medium of claim 1, wherein distinguishing article candidates includes identifying an article candidate that includes an article body, the identified article candidate being an article candidate that occupies a larger area near a top and center of the web page than other article candidates.

6. The medium of claim 5, wherein distinguishing article candidates includes identifying an article title, the article title being text that:
    has a top that is positioned no lower than a top of the article body; and
    has a text size that is no smaller than that of the article body.

7. The medium of claim 5, wherein distinguishing article candidates includes identifying an image caption, the image caption being text that is not identified as part of the article body and is positioned adjacent to an image that is part of the article body.

8. A system for producing web page content, the system comprising:
    a block engine to identify blocks within a web page;
    a assembly engine to selectively assemble the blocks into sections and to selectively assemble the sections into article candidates;
    an article engine to distinguish an article candidate that includes article content from article candidates that do not include article content, by identifying an article candidate that includes an article body, the identified article candidate being an article candidate that occupies a larger area near a top and center of the web page than other article candidates; and
    a production engine to produce content just from the article candidate distinguished as including article content.

9. The system of claim 8, wherein the assembly engine selectively assembles blocks into sections by:
    identifying one or more frames within the web page, each frame encompassing one or more of the blocks; and
    grouping the blocks into sections such that each section only includes blocks that are not separated by a frame.

10. The system of claim 9, wherein the blocks include text blocks arranged in a top to bottom order within the web page and wherein the assembly engine groups the blocks by:
    combining a text block with a subsequent text block within the order only if the two visual text blocks are not separated by a frame, have no vertical overlap, share at least a partial horizontal overlap, and share a common visual attribute; and
    following the top to bottom order, iteratively repeating the combining until no text blocks can be combined.

11. The system of claim 8, wherein the assembly engine selectively assembles the sections into article candidates by, following a top to bottom order, combining a section with a previous section in the order upon a positive determination of one or more the following:
    the section is a text section with a character count that exceeds a minimum threshold and has a left or right margin that is aligned with the left or right margin of the previous section;
    the section is a text section sharing visual attributes of the previous section; and
    the section is an image section having a size exceeding a threshold size and shares at least a partial horizontal overlap with the previous section.

12. The system of claim 8, wherein selectively the assembly engine selectively assembles sections into article candidates by combining text and image sections separated by horizontal lines into article candidates, wherein combining includes:

detecting horizontal lines between sections; and preventing two sections separated by a detected horizontal line from being combined if that horizontal line has a length that is equal to a greater of the widths of two sections and either one of the two sections is a text section that does not have a character count that exceeds a threshold or one of the two sections is an image section whose size does not exceed a threshold size.

13. The system of claim 8, wherein the article engine distinguishes article candidate by identifying an article title, the article title being text that:

has a top that is positioned no lower than a top of the article body; and has a text size that is no smaller than that of the article body.

14. The system of claim 8, wherein the article engine distinguishes article candidates by identifying an image caption, the image caption being text that is not identified as part of the article body and is positioned adjacent to an image that is part of the article body.

15. A method for producing web page content, the method comprising:

identifying blocks within a web page;

selectively assembling the blocks into sections;

selectively assembling the sections into article candidates, by following a top to bottom order, combining a section with a previous section in the order upon a positive determination of one or more the following:

the section is a text section with a character count that exceeds a minimum threshold and has a left or right margin that is aligned with the left or right margin of the previous section;

the section is a text section sharing visual attributes of the previous section; and the section is an image section having a size exceeding a threshold size and shares at least a partial horizontal overlap with the previous section;

distinguishing an article candidate that include article content from article candidates that do not include article content; and producing content just from the article candidate distinguished as including article content.

16. The method of claim 15, wherein selectively assembling blocks into sections comprises:

identifying one or more frames within the web page, each frame encompassing one or more of the blocks; and grouping the blocks into sections such that each section only includes blocks that are not separated by a frame.

17. The method of claim 15, wherein distinguishing article candidates includes:

identifying an article candidate that includes an article body, the identified article candidate being an article candidate that occupies a larger area near a top and center of the web page than other article candidates;

identifying an article title, the article title being text that has a top that is positioned no lower than a top of the article body and has a text size that is no smaller than that of the article body; and identifying an image caption, the image caption being text that is not identified as part of the article body and is positioned adjacent to an image that is part of the article body.

\* \* \* \* \*

UNITED STATES PATENT AND TRADEMARK OFFICE
CERTIFICATE OF CORRECTION

PATENT NO. : 9,218,322 B2  
APPLICATION NO. : 13/811912  
DATED : December 22, 2015  
INVENTOR(S) : Jian Fan et al.

Page 1 of 1

It is certified that error appears in the above-identified patent and that said Letters Patent is hereby corrected as shown below:

Claims

In column 13, line 56, in Claim 3, delete "section. and" and insert -- section; and --, therefor.

Signed and Sealed this
Thirty-first Day of May, 2016

Michelle K. Lee
*Director of the United States Patent and Trademark Office*